United States Patent
Ozaki (10) Patent No.: US 10,959,249 B2
(45) Date of Patent: Mar. 23, 2021

(54) WIRELESS COMMUNICATION DEVICE AND METHOD

(71) Applicant: ALPINE ELECTRONICS, INC., Tokyo (JP)

(72) Inventor: Daisuke Ozaki, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 86 days.

(21) Appl. No.: 16/566,177

(22) Filed: Sep. 10, 2019

(65) Prior Publication Data

US 2020/0092898 A1 Mar. 19, 2020

(30) Foreign Application Priority Data

Sep. 13, 2018 (JP) .............................. JP2018-171519

(51) Int. Cl.
  *H04W 72/12* (2009.01)
  *H04W 28/20* (2009.01)
  *H04W 72/08* (2009.01)
  *H04W 72/10* (2009.01)

(52) U.S. Cl.
  CPC ....... *H04W 72/1242* (2013.01); *H04W 28/20* (2013.01); *H04W 72/082* (2013.01); *H04W 72/10* (2013.01); *H04W 72/1231* (2013.01); *H04W 72/1247* (2013.01)

(58) Field of Classification Search
  CPC combination set(s) only.
  See application file for complete search history.

(56) References Cited

U.S. PATENT DOCUMENTS

| 2014/0213235 A1* | 7/2014 | Lou .................. H04B 1/525 455/418 |
| 2015/0031408 A1* | 1/2015 | Kalla .................. H04W 52/38 455/522 |
| 2015/0071088 A1* | 3/2015 | Gottimukkala ....... H04W 24/02 370/252 |
| 2015/0289221 A1* | 10/2015 | Nayak ................. H04W 48/18 455/435.1 |

FOREIGN PATENT DOCUMENTS

JP    2016-511578    4/2016
WO    2014/121305 A2    8/2014

OTHER PUBLICATIONS

Extended European Search Report dated Feb. 6, 2020 in corresponding European Application No. 19197016.9.

* cited by examiner

*Primary Examiner* — Kyaw Z Soe

(74) *Attorney, Agent, or Firm* — Brinks Gilson & Lione (57) ABSTRACT

The wireless communication device includes an RF front end, a base band processing unit which transfer data of two lines, a communication priority storage unit which stores priority information indicating priorities of transmission and reception of each data type to be transmitted, a priority comparison unit which compares a priority of the data type of a transmission target with a priority of the data type of a reception target on the basis of the priority information in a case where data is transmitted through one line and data is received through the other line at the same time, and a transmission restriction unit which restricts a communication volume of data transmission in one line when the priority comparison unit obtains a comparison result that the priority of the data type of the reception target is high.

18 Claims, 6 Drawing Sheets

FIG. 2

| DATA TYPE | COMMUNICATION DIRECTION | UL PRIORITY | DL PRIORITY |
|---|---|---|---|
| EMERGENCY CALL | UL/DL | 1 | 1 |
| RUNNING HISTORY | UL | 2 | — |
| MAP UPDATE | DL | — | 3 |
| CAMERA DATA | DL | — | 1 |
| USER DATA | UL | 3 | — |

(NO COMMUNICATION RESTRICTION)

| SIM | DATA TYPE | COMMUNICATION DIRECTION | PRIORITY |
|---|---|---|---|
| SIM122 | RUNNING HISTORY | UL | 2 |
| SIM124 | MAP UPDATE | DL | 3 |

FIG. 5

(COMMUNICATION RESTRICTION)

| SIM | DATA TYPE | COMMUNICATION DIRECTION | PRIORITY |
|---|---|---|---|
| SIM122 | RUNNING HISTORY | UL | 2 |
| SIM124 | CAMERA DATA | DL | 1 |

| SIM | DATA TYPE | COMMUNICATION DIRECTION | PRIORITY | COMMUNICATION VOLUME |
|---|---|---|---|---|
| SIM122 | MAP UPDATE | DL | 3 | 500MB |
| SIM124 | USER DATA | UL | 3 | 1MB | ically disposed in one chip. Therefore, if an intensive
WIRELESS COMMUNICATION DEVICE AND METHOD

RELATED APPLICATIONS

The present application claims priority to Japanese Patent Appln. No. 2018-171519, filed Sep. 13, 2018, the entire disclosure of which is hereby incorporated by reference.

BACKGROUND OF THE DISCLOSURE

Field of the Disclosure

The present disclosure relates to a wireless communication device and a method which performs communication through a plurality of lines at the same time.

Description of the Related Art

Recently, wireless communication devices have come on the market that can be connected to two mobile network lines corresponding to two subscriber identity modules (SIMs). Among them, a device which can communicate through two lines at the same time is called a dual SIM dual active (DSDA).

In particular, in the case of DSDA, a configuration is known which includes RF circuits for two lines which are closely disposed in one chip. Therefore, if an intensive output is transmitted through one line, and a weak input is received through the other line, a downlink throughput of the reception side is lowered due to interference. There has been known a technique that an uplink transmission power of the transmission side is reduced by detecting the interference in such a case so as to improve the downlink throughput (for example, see JP 2016-511578 A).

SUMMARY

In a technique disclosed in JP 2016-511578 A, a downlink throughput can be improved at a time of interference, but an uplink throughput of a transmission side is lowered. In a case where important data is transmitted, there is an adverse effect such as delaying.

The present disclosure has been made in view of the above problem, and it is an object to provide a wireless communication device and a method which can prevent a delay in a transmission of important data by adjusting communication restrictions according to an importance (a priority) of the transfer data.

To address the above problem, a wireless communication device of the disclosure includes two wireless communication units configured to transfer data, a communication priority storage unit configured to store priority information indicating priorities of transmission and reception of each data type to be transmitted, a priority comparison unit configured to compare a priority of the data type of a transmission target with a priority of the data type of a reception target on the basis of the priority information in a case where data is transmitted by one wireless communication unit and data is received by the other wireless communication unit at the same time, and a transmission restriction unit configured to restrict a communication volume of data transmission in the one wireless communication unit when the priority comparison unit obtains a comparison result that the priority of the data type of the reception target is higher.

The communication volume of the data transmission is restricted in a case where the priority of the reception data is high. Therefore, in a case where the important data is transmitted, the restriction of the communication volume of the data transmission may be nullified, so that it is possible to prevent that the transmission of the important data is delayed.

In some implementations, there is provided an interference detection unit which detects whether interference occurs in a transferring operation of data of the above-described two wireless communication units. The transmission restriction unit may restrict the communication volume of data transmission when the interference detection unit detects that the interference occurs. With this configuration, the data can be transmitted according to the importance and the priority without uniformly restricting the communication volume of the data transmission at the time of interference.

In some implementations, in a case where data reception of the other wireless communication unit is difficult due to the interference occurring in the transferring operation, the above-described transmission restriction unit may restrict the communication volume of data transmission in the one wireless communication unit to eliminate the difficult situation. With this configuration, even in a case where the priority of the transmission data is high, the data reception can be continuously performed at the same time.

In some implementations, the interference detection unit may detect that the interference occurs when a combination of the transmission and reception states of data of the two wireless communication units satisfies an interference occurrence condition which is set in advance. With this configuration, it is possible to easily detect that the interference occurs without a complicated process or a complicated detection operation.

In some implementations, a large total volume of communication may be performed with priority when the above-described priority comparison unit obtains a comparison result that the priority of the data type of the transmission target and the priority of the data of the reception target are equal. With this configuration, it is possible to shorten the communication time of the data having a large total volume of communication.

In some implementations, the two wireless communication units may perform communication through two lines at the same time by a dual SIM dual active (DSDA). The functions of the DSDA are configured by one chip in many cases, and the antennas are also closely disposed. Therefore, the interference occurs easily in a case where the transmission and the reception are performed using two lines at the same time. However, even in this case, the data of high importance can be transmitted with priority, and the delay of the transmission of the important data can be securely prevented.

In some implementations, the above-described transmission restriction unit may lower an intensity of a signal output from an antenna to restrict the communication volume of data transmission. With this configuration, it is possible to eliminate the caused interference.

In some implementations, data transmitted by the wireless communication unit may be data related to an emergency call which is performed by a telematics control unit. With this configuration, even in a case where the interference occurs, it is possible to transmit data related to the important emergency call with priority.

A wireless communication method is also disclosed. In one form, a wireless communication method of the disclosure includes: detecting, by an interference detection unit, whether interference occurs in a data transferring operation of the two wireless communication units which transfer data; comparing, by a priority comparison unit, a priority of a data type of a transmission target with a priority of a data type of a reception target in a case where data is transmitted by one wireless communication unit, data is received by the other wireless communication unit at the same time, and the interference detection unit detects that interference occurs; and restricting, by a transmission restriction unit, a communication volume of data transmission in the one wireless communication unit when the priority comparison unit obtains a comparison result that the priority of the data type of the reception target is higher.

At the time of interference, the communication volume of the data transmission is restricted in a case where the priority of the reception data is high. Therefore, in a case where the important data is transmitted, the restriction of the communication volume of the data transmission may be nullified, so that it is possible to prevent that the transmission of the important data is delayed.

DESCRIPTION OF THE DRAWINGS

Figure 1:
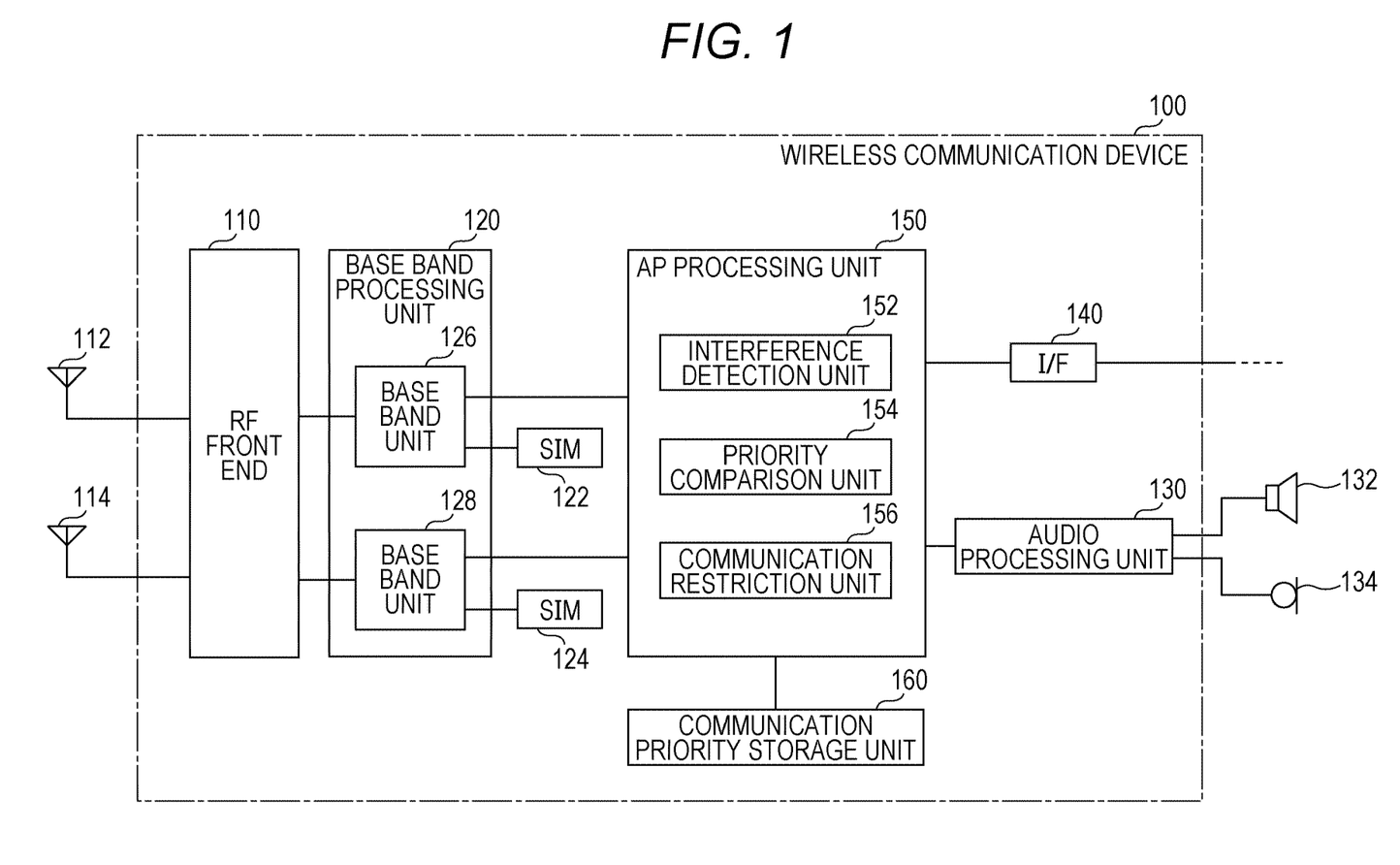
FIG. 1 is a diagram illustrating one form of a wireless communication device.

FIG. 1 is a diagram illustrating one form of a wireless communication device. A wireless communication device 100 illustrated in FIG. 1 is a telematics control unit (TCU) to be mounted in a vehicle, for example. In some implementations, the wireless communication device 100 performs functions of relaying data transfer in a wireless connection between other in-vehicle devices (navigation device, etc.) and an external server, as well as performs functions such as making an emergency call in a wireless connection to a call center (not illustrated) when a user (a driver of the vehicle) meets with a trouble.

The wireless communication device 100 includes an RF front end 110, a base band processing unit 120, an audio processing unit 130, an interface unit (I/F) 140, an application processing unit (AP processing unit) 150, and a communication priority storage unit 160.

The RF front end 110 modulates a base band signal to a frequency band of a carrier wave and transmits the signal from an antenna. The RF front end 100 also demodulates a signal of the frequency band of the carrier wave received by the antenna into the base band signal. In some implementations, the communication can be performed at the same time using two lines, so that there are provided two antennas 112 and 114 in the RF front end 110.

The base band processing unit 120 performs a data transferring process in conformity with a predetermined communication protocol. In some implementations, there are included two base band units 126 and 128 to perform the data transferring process separately on two lines corresponding to two SIMs 122 and 124 of the dual SIM dual active (DSDA).

The audio processing unit 130 is configured to perform a process related to audio signals. For example, the audio processing unit 130 decodes audio data into an analog audio signal and outputs the signal from a speaker 132, or encodes a user's voice collected by a microphone 134 and converts the voice into digital audio data.

The interface unit 140 inputs and outputs data with respect to other in-vehicle devices (for example, a head unit which includes an operation unit and a display unit, a navigation device, an in-vehicle camera, etc.).

The application processing unit 150 is configured to control the entire wireless communication device 100, and is realized by a processor such as a central processing unit (CPU) executing a predetermined application program stored in memory such as a read-only memory (ROM) or a random-access memory (RAM). The application processing unit 150 may include an interference detection unit 152, a priority comparison unit 154, and a transmission restriction unit 156.

In a case where two lines are used at the same time such that one line is for data transmission and the other line is for data reception, the interference detection unit 152 detects whether there is interference in a data transferring operation in each of two lines. If a strong output (strong electric field) of transmission is performed by one line and a weak input (weak electric field) of reception is performed by the other line, a downlink throughput of the reception side is lowered by the interference. For example, information (interference occurrence condition) of a combination of a transfer frequency and a transfer electric field intensity at which the interference occurs is stored in a table. It is determined whether a combination of actual transmission and reception states corresponds to the interference occurrence condition which is set in advance and stored in the table, so that the interference occurrence can be detected. Further, other methods may be performed to detect the interference occurrence.

In a case where two lines are used at the same time such that one line is for data transmission and the other line is for data reception, the priority comparison unit 154 compares a priority of a data type of a transmission target and a priority of a data type of a reception target on the basis of priority information stored in the communication priority storage unit 160. In the communication priority storage unit 160, the priority information is stored which indicates priorities of transmission and reception for each data type of the communication target.

Figure 2:
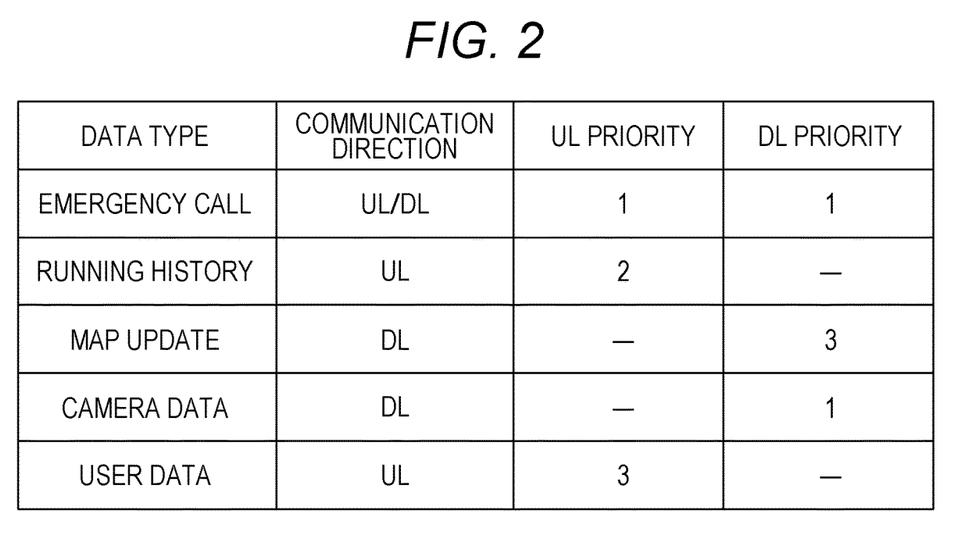
FIG. 2 is a diagram illustrating an example of priority information which is stored in a communication priority storage unit.

FIG. 2 is a diagram illustrating an example of the priority information which is stored in the communication priority storage unit 160. In FIG. 2, "UL" represents an uplink to perform the data transmission, and "DL" represents a downlink to perform the data reception. In addition, "emergency call" represents data to be transferred in the emergency call at the time of accident of the vehicle where the wireless communication device 100 is mounted, "running history" represents data to be transmitted after detecting a running state of the vehicle, "map update" represents data to be received to update map information which is used in a navigation process, "camera data" represents data to be received when a running lane tracking or an autonomous driving, and "user data" represents data related to an individual which is transmitted according to a user's command.

In the example illustrated in FIG. 2, an UL (uplink) priority and a DL (downlink) priority of the data type "emergency call" and a DL priority of "camera data" of the data type are highest, and are set to "1". In addition, the UL priority of the data type "running history" is set to the next highest value "2". In addition, the DL priority of the data type "map update" and the UL priority of the data type "user data" are set to the lowest value "3". Further, the specific example is given in order to help with understanding on the explanation. The data types and the values (order) of the UL priority and the DL priority may be arbitrarily set at the time of manufacturing a product.

The transmission restriction unit 156 restricts a communication volume of the data transmission when a comparison result showing that the priority of the data type of the reception target is determined high by the priority comparison unit 154.

The above-described RF front end 110, the antennas 112 and 114, the base band processing unit 120, and the SIMs 122 and 124 correspond to two wireless communication units, the communication priority storage unit 160 to the communication priority storage unit, the priority comparison unit 154 to the priority comparison unit, the transmission restriction unit 156 to the transmission restriction unit, and the interference detection unit 152 to the interference detection unit, respectively.

Communication restriction at the time of interference will be described.

Figure 3:
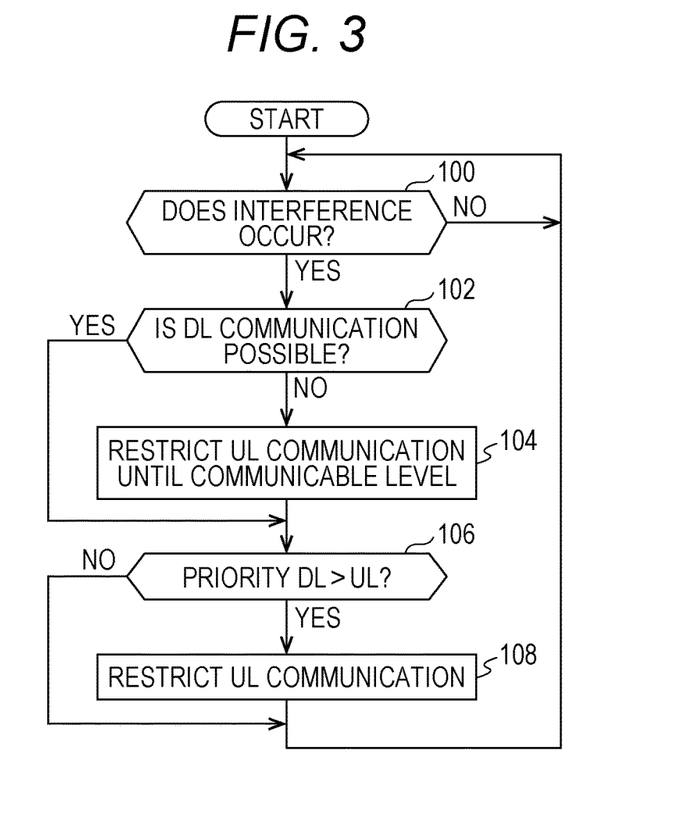
FIG. 3 is a flowchart illustrating one form of an operation procedure of communication restriction at the time of interference.

FIG. 3 is a flowchart illustrating one form of an operation procedure which performs a communication restriction at a time of interference. The interference detection unit 152 determines whether the interference occurring between two lines is detected (Step 100). If any one of the base band units 126 and 128 performs the data transmission and the other one performs the data reception in parallel, and a combination of a transfer frequency and a transfer electric field intensity satisfies the interference occurrence condition, the interference is detected. Therefore, in other cases, the interference is not detected, the negative determination is made in the determination of Step 100, and the determination is repeatedly performed.

In addition, if the interference is detected, the positive determination is made in the determination of Step 100. Next, the transmission restriction unit 156 determines whether a downlink communication (data reception operation) is possible in the reception side where the interference occurs (Step 102). In a case where the degree of interference is large and the data reception is difficult, the negative determination is made. In this case, the transmission restriction unit 156 restricts the uplink communication (data transmission operation) until the reception side becomes a communicable level (a level where an expected lowest communication volume of data can be maintained) (Step 104). For example, the transmission restriction unit 156 sends a command to the RF front end 110 to lower a signal intensity (transmission power) output from the antenna 112 (or 114) until the reception side becomes the communicable level.

In addition, in a case where the downlink communication is possible on the reception side without performing the communication restriction, the positive determination is performed in Step 102. Next, alternatively, in a case where the communication restriction is required, the priority comparison unit 154 compares the priority (DL priority) of the data type in the data reception through one line and the priority (UL priority) of the data type in the data transmission through the other line after the uplink communication in Step 104 is restricted, and determines whether the DL priority is higher than the UL priority (Step 106). In other words, it is determined whether the data of the reception target is more important than the data of the transmission target and to be processed with priority. In a case where the DL priority is higher than the UL priority (a case where the data of the reception target is more important), the positive determination is performed. In this case, the transmission restriction unit 156 restricts the uplink communication (data transmission operation) (Step 108). For example, similar to the communication restriction of Step 104, the transmission restriction unit 156 sends a command to the RF front end 110 to lower the signal intensity (transmission power) which is output from the antenna. Thereafter, the process returns to Step 100, and the determination on whether the interference occurs is repeatedly performed.

In addition, in a case where the UL priority is higher than the DL priority (a case where the data of the transmission target is more important), the negative determination is made in the determination of Step 106. In this case, the process returns to Step 100 without performing the communication restriction of Step 108, the determination on whether the interference occurs is repeatedly performed.

Figure 4:
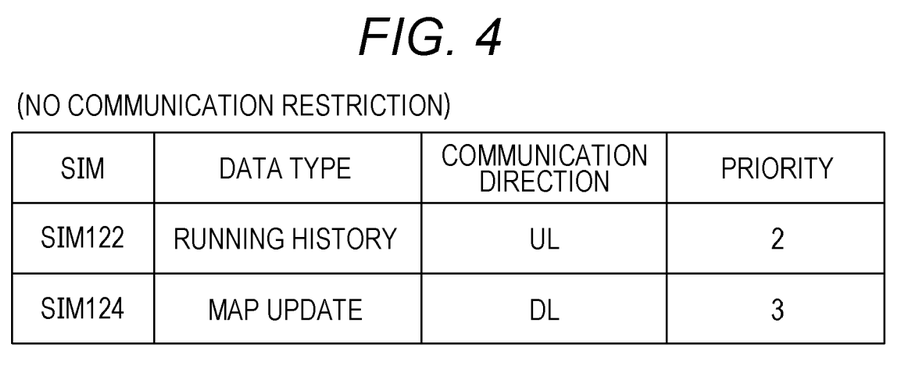
FIG. 4 is a diagram illustrating an example of a case where the communication restriction is not performed.

FIG. 4 is a diagram illustrating a specific example of a case where the communication restriction is not performed. In this example, the data transmission of the data type "running history" is performed using the line on a side of the SIM 122, and the corresponding UL priority becomes "2". In addition, the data reception of the data type "map update" is performed using the line on a side of the SIM 124, and the corresponding DL priority becomes "3". In such a case, the UL priority is higher than the DL priority, and the negative determination is made in the determination of Step 106 of FIG. 3. Therefore, the uplink communication (data transmission operation) of Step 108 is not restricted.

Figure 5:
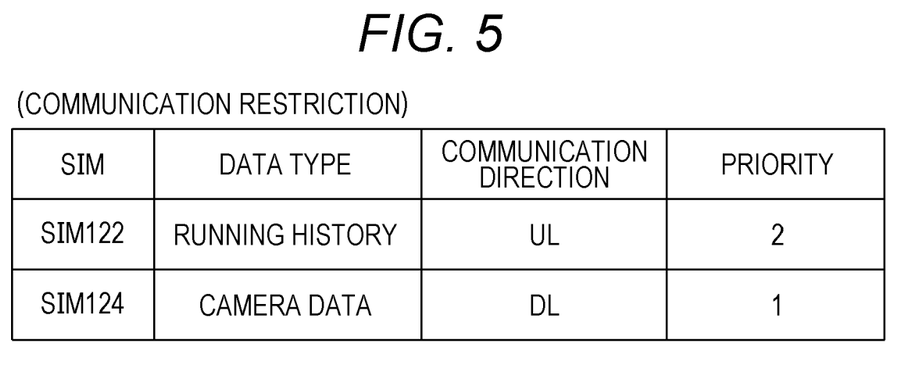
FIG. 5 is a diagram illustrating an example of a case where the communication restriction is performed.

FIG. 5 is a diagram illustrating an example of a case where the communication restriction is performed. In this example, the data transmission of the data type "running history" is performed using the line on a side of the SIM 122, and the corresponding UL priority becomes "2". In addition, the data reception of the data type "camera data" is performed using the line on a side of the SIM 124, and the corresponding DL priority becomes "1". In such a case, the DL priority is higher than the UL priority, and the positive determination is made in the determination of Step 106 of FIG. 3. Therefore, the uplink communication (data transmission operation) of Step 108 is restricted.

Figure 6:
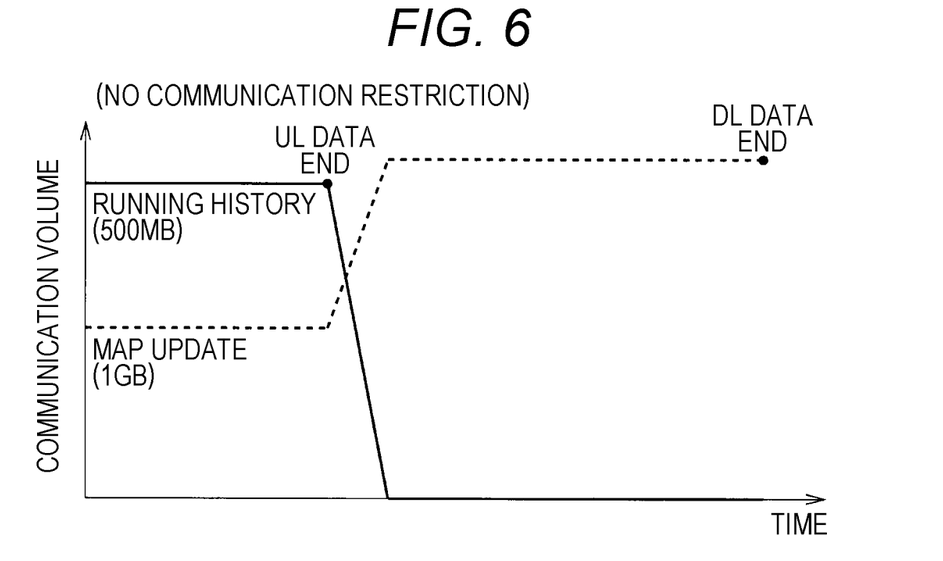
FIG. 6 is a diagram illustrating an outline of a communication operation when the communication restriction is not performed at the time of interference.

FIG. 6 is a diagram illustrating an outline of one form of a communication operation when the communication restriction is not performed at the time of interference. It is assumed that the content of the transfer data is illustrated in FIG. 4, 500 MB data of the data type "running history" is transmitted, and 1 GB data of the data type "map update" is received in parallel. In this case, even if the interference occurs, the communication restriction is not performed. Therefore, the more important data type "running history" (high priority) can be transmitted to be completed earlier.

Figure 7:
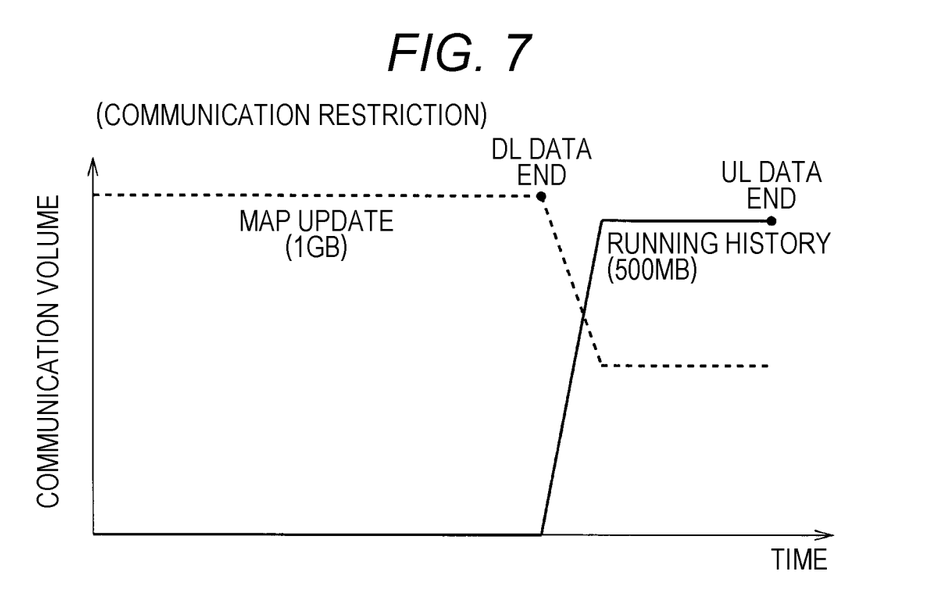
FIG. 7 is a diagram illustrating an outline of the communication operation of the related art when the communication restriction is performed at the time of interference.

FIG. 7 is a diagram illustrating an outline of the communication operation of the related art when the communication restriction is performed at the time of interference. Similar to the example illustrated in FIG. 6, it is assumed that 500 MB data of the data type "running history" is transmitted, and 1 GB data of the data type "map update" is received in parallel. In the related art, if the interference is detected, the communication of the uplink side is restricted. Therefore, the data reception of the data type "map update" is processed with priority, and the data transmission of the more important data type "running history" is performed later.

In this way, in some implementations of the wireless communication device 100, the communication volume of the data transmission is restricted in a case where the priority of the reception data is high. Therefore, in a case where the important data is transmitted, the restriction of the communication volume of the data transmission may be nullified, so that it is possible to prevent that the transmission of the important data is delayed. In addition, the data can be transmitted according to the importance and the priority without uniformly restricting the communication volume of the data transmission at the time of interference.

In a case where the data reception is difficult as the interference occurs in the transfer operation, the communication volume of the data transmission is restricted in order to release the difficult state. Therefore, even in a case where the priority of the transmission data is high, the concurrent data reception can be maintained.

When a combination of the transmission and reception states of data of two lines satisfies the interference occurrence condition set in advance, the interference occurrence is detected. Therefore, the interference can be detected easily without performing a complicate process and a detection operation.

In some implementations, the functions of the DSDA are configured by one chip in many cases, and the antennas 112 and 114 are also closely disposed. Therefore, the interference occurs easily in a case where the transmission and the reception are performed using two lines at the same time. However, even in this case, the data of high importance can be transmitted with priority, and the delay of the transmission of the important data can be securely prevented.

In some implementations, the communication volume of the data transmission is restricted by lowering the intensity (transmission power) of the signal output from the antenna, so that the caused interference can be eliminated.

The data related to the emergency call performed by the TCU is included as data to be transmitted. Even in a case where the interference occurs, the data related to the more important emergency call can be sent with priority.

Further, the disclosure is not limited to the implementations described above, and various modifications can be made within a scope of the spirit of the disclosure. For example, in the implementations described above, the uplink communication restriction is not performed in a case where the UL priority is higher than the DL priority. On the contrary, in a case where the DL priority is higher than the UL priority, the uplink communication restriction is performed. However, in a case where the UL priority and the DL priority are equal, the communication which has a large total volume of communication and requires a communication time may be performed with priority. With this configuration, it is possible to shorten the communication time of the data having a large total volume of communication.

Figure 8:
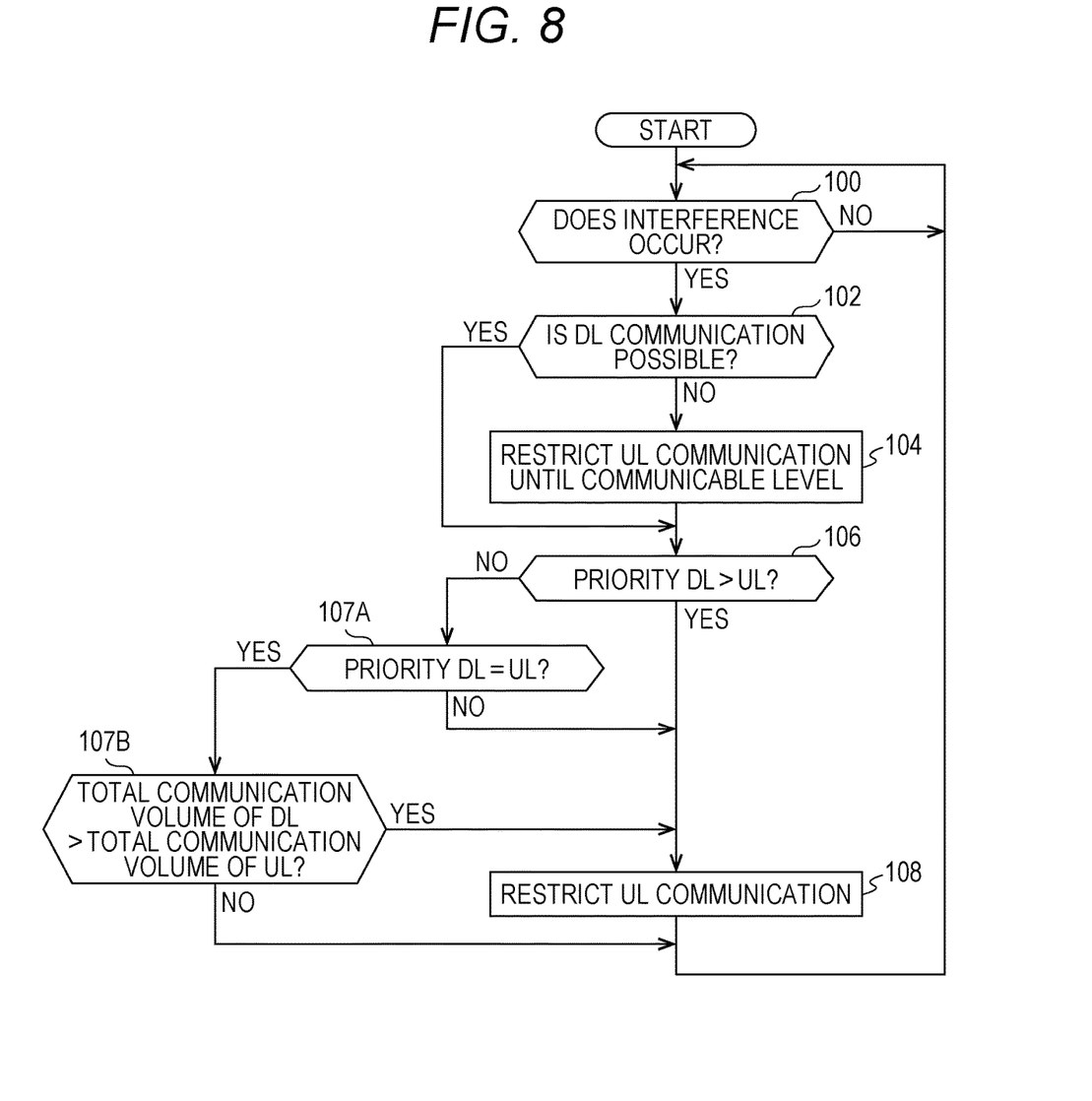
FIG. 8 is a flowchart illustrating an operation procedure of a modification which additionally includes an operation in a case where a UL priority and a DL priority are equal.

FIG. 8 is a flowchart illustrating one form of an operation procedure of a modification which additionally includes an operation in a case where the UL priority and the DL priority are equal. The operation procedure illustrated in FIG. 8 is different from the operation procedure illustrated in FIG. 3 in that the operations of Steps 107A and 107B are added next to Step 106. In the following, the description will be given focusing on these added Steps 107A and 107B.

In a case where the DL priority is not higher than the UL priority, the negative determination is made in the determination of Step 106. Next, the priority comparison unit 154 determines whether the DL priority and the UL priority are equal (Step 107A). In a case where these priorities are not equal (a case where the UL priority is higher than the DL priority), the negative determination is made, and the process proceeds to Step 108 to restrict the uplink communication. In addition, in a case where the priorities are equal, the positive determination is made in the determination of Step 107A.

Next, the transmission restriction unit 156 determines whether the total volume of downlink communication of data reception is larger than the total volume of uplink communication of data transmission (Step 107B). In a case where the total volume of downlink communication is large, and a time required for data reception becomes long, the positive determination is made. In this case, the process proceeds to Step 108 to restrict the uplink communication. With this configuration, the interference can be eliminated, and the communication time required for data reception can be shortened. On the contrary, in a case where the total volume of uplink communication is large, and the time required for data transmission becomes long, the negative determination is made in the determination of Step 107B. In this case, the restriction of the uplink communication is not performed. With this configuration, the interference is not eliminated, but the communication time required for the data transmission can be shortened.

Figure 9:
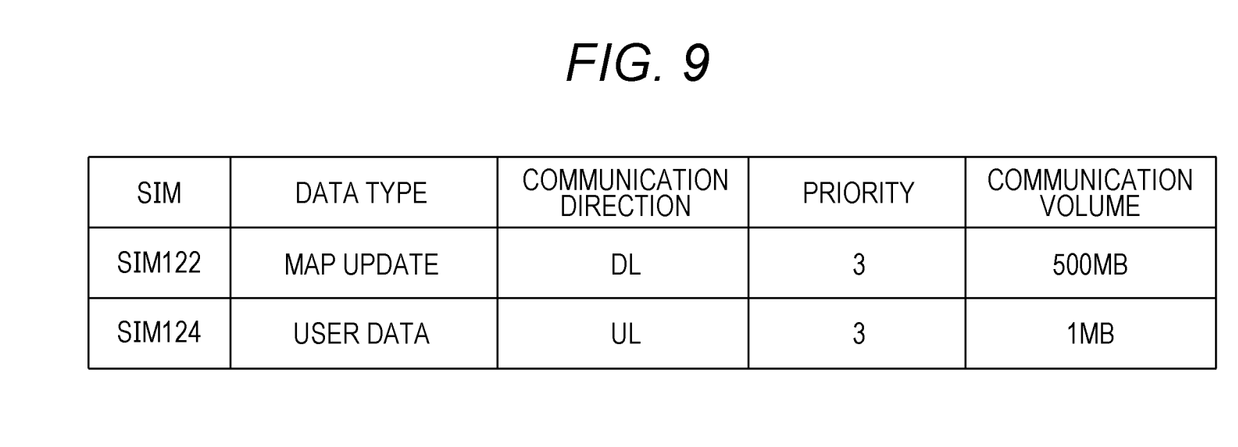
FIG. 9 is a diagram illustrating a specific example of a case where the DL priority and the UL priority are equal, a total volume of uplink communication is large, and thus the communication restriction is not performed.

FIG. 9 is a diagram illustrating an example in a case where the DL priority and the UL priority are equal, the total volume of uplink communication is large, and thus the communication restriction is not performed. In this example, the data reception of the data type "map update" is performed using the line on a side of the SIM 122, and the corresponding DL priority becomes "3". In addition, the data transmission of the data type "user data" is performed using the line on a side of the SIM 124, and the corresponding UL priority becomes "3". In such a case, the UL priority and the DL priority are equal, the total volume "500 MB" of uplink communication of the data transmission is larger than the total volume "1 MB" of downlink communication of the data reception, and the negative determination is made in the determination of Step 107B of FIG. 8. Therefore, the restriction of the uplink communication (data transmission operation) of Step 108 is not performed.

In implementations described above, the description has been given about the case of the DSDA using two SIMs. However, the disclosure may be applied even to a case where the communication is performed without SIM as long as the transmission operation and the reception operation can be performed at the same time through two lines.

Further, in implementations described above, the wireless communication device 100 has been described as the TCU mounted in the vehicle, but the disclosure is not limited thereto, and may be applied to a wireless communication device 100 other than the TCU.

As described above, according to the disclosure, the communication volume of the data transmission is restricted in a case where the priority of the reception data is high. Therefore, in a case where the important data is transmitted, the restriction of the communication volume of the data transmission may be nullified, so that it is possible to prevent that the transmission of the important data is delayed.

What is claimed is:

1. A wireless communication device which includes two wireless communication units configured to transfer data, comprising:
   a memory configured to store priority information indicating priorities of transmission and reception of each data type to be transmitted; and
   a processor in communication with the memory and configured to:
      compare a priority of a data type of a transmission target with a priority of a data type of a reception target on a basis of the priority information in a case where data is transmitted by one wireless communication unit and data is received by another wireless communication unit at the same time; and
      restrict a communication volume of data transmission in the one wireless communication unit when a comparison result indicates that the priority of the data type of the reception target is higher.

2. The wireless communication device according to claim 1, wherein the processor is further configured to:
   detect whether an interference occurs in a transferring operation of data of the two wireless communication units, and
   restrict the communication volume of data transmission when the processor detects that the interference occurs.

3. The wireless communication device according to claim 2, wherein, in a case where data reception of the other wireless communication unit is difficult due to the interference occurring in the transferring operation, the processor is configured to restrict the communication volume of data transmission in the one wireless communication unit to eliminate the difficult situation.

4. The wireless communication device according to claim 3, wherein the processor is further configured to detect that the interference occurs when a combination of transmission and reception states of data of the two wireless communication units satisfies an interference occurrence condition which is set in advance.

5. The wireless communication device according to claim 4, wherein a large total volume of communication is performed with priority when the comparison result indicates that a priority of the data type of the transmission target and a priority of the data of the reception target are equal.

6. The wireless communication device according to claim 5, wherein the two wireless communication units are configured to perform communication through two lines at the same time by a dual SIM dual active (DSDA).

7. The wireless communication device according to claim 6, wherein the processor is configured to lower an intensity of a signal output from an antenna to restrict the communication volume of data transmission.

8. The wireless communication device according to claim 7, wherein data transmitted by the wireless communication unit is data related to an emergency call which is performed by a telematics control unit.

9. The wireless communication device according to claim 2, wherein the processor is configured to detect that the interference occurs when a combination of transmission and reception states of data of the two wireless communication units satisfies an interference occurrence condition which is set in advance.

10. The wireless communication device according to claim 9, wherein a large total volume of communication is performed with priority when the comparison result indicates that the priority of the data type of the transmission target and the priority of the data of the reception target are equal.

11. The wireless communication device according to claim 10, wherein the two wireless communication units are configured to perform communication through two lines at the same time by a dual SIM dual active (DSDA).

12. The wireless communication device according to claim 11, wherein the processor is configured to lower an intensity of a signal output from an antenna to restrict the communication volume of data transmission.

13. The wireless communication device according to claim 12, wherein data transmitted by the wireless communication unit is data related to an emergency call which is performed by the processor.

14. The wireless communication device according to claim 1, wherein a large total volume of communication is performed with priority when the comparison result indicates that a priority of the data type of the transmission target and a priority of the data of the reception target are equal.

15. The wireless communication device according to claim 14, wherein the two wireless communication units are configured to perform communication through two lines at the same time by a dual SIM dual active (DSDA).

16. The wireless communication device according to claim 15, wherein the processor is configured to lower an intensity of a signal output from an antenna to restrict the communication volume of data transmission.

17. The wireless communication device according to claim 16, wherein data transmitted by the wireless communication unit is data related to an emergency call which is performed by the processor.

18. A wireless communication method of a wireless communication device which includes two wireless communication units configured to transfer data, the method comprising:
   detecting, by a processor of the wireless communication device, whether interference occurs in a data transferring operation of the two wireless communication units;
   comparing, by the processor, a priority of a data type of a transmission target with a priority of a data type of a reception target in a case where data is transmitted by one wireless communication unit, data is received by the other wireless communication unit at the same time, and the processor detects that interference occurs; and
   restricting, by the processor, a communication volume of data transmission in the one wireless communication unit when the priority comparison unit obtains a comparison result that the priority of the data type of the reception target is higher.

* * * * *